United States Patent [19]

Toulhoat et al.

[11] Patent Number: 4,498,972
[45] Date of Patent: Feb. 12, 1985

[54] HYDROTREATMENT PROCESS FOR CONVERTING A HEAVY HYDROCARBON FRACTION CONTAINING SULFUR IMPURITIES AND METAL IMPURITIES TO A LIGHTER OIL, IN AT LEAST TWO STEPS

[75] Inventors: Hervé Toulhoat, Le Pecq; Jean-Claude Plumail, Le Vesinet; Alain Billon, Orlienas; Alain Quignard, Rillieux La Pape, all of France

[73] Assignee: Institut Francais du Petrole, Rueil-Malmaison, France

[21] Appl. No.: 567,207

[22] Filed: Dec. 30, 1983

[30] Foreign Application Priority Data

Dec. 31, 1982 [FR] France ............................. 82 22180

[51] Int. Cl.³ ............................................. C10G 65/02
[52] U.S. Cl. ....................................... 208/59; 208/89; 208/97; 208/210; 208/216 R; 208/251 H
[58] Field of Search ....................... 208/58, 59, 89, 97, 208/210, 216 PP, 211, 251 H, 216 R; 502/439

[56] References Cited

U.S. PATENT DOCUMENTS 3,770,617 11/1973 Riley et al. ........................ 208/217
3,901,792 8/1975 Wolk et al. .................... 208/216 PP
3,947,347 3/1976 Mitchell .......................... 208/251 H
4,016,067 4/1977 Fischer et al. ........................ 208/89
4,225,421 9/1980 Hensley, Jr. et al. ........ 208/216 PP
4,395,329 7/1983 LePage et al. ................ 208/216 PP Primary Examiner—Delbert E. Gantz
Assistant Examiner—Lance Johnson
Attorney, Agent, or Firm—Millen & White

[57] ABSTRACT

A process for the hydrotreatment of a heavy hydrocarbon fraction containing sulfur and metal impurities comprises at least two steps: a first step using a catalyst comprising a low proportion of at least one metal of groups V, VI and VIII, said catalyst being in the form of a plurality of juxtaposed agglomerates each formed of a plurality of acicular plates, the plates of each agglomerate being generally oriented radially with respect to one another and with respect to the center of the agglomerate, the carrier of this catalyst being preferably inert; and a second step using a catalyst which could be of the same type but with a higher proportion of metals. This process is useful for the conversion of crude oils, straight run hydrocarbon residues, deasphalted oils, asphalts dissolved in aromatic distillates and coal hydrogenates.

15 Claims, 5 Drawing Figures

1cm=0.5 μm

1cm = 33 μm

1cm = 3.3 μm

1cm=1μm

1cm=0.5μm 1 mm = 9 nanomètres

HYDROTREATMENT PROCESS FOR CONVERTING A HEAVY HYDROCARBON FRACTION CONTAINING SULFUR IMPURITIES AND METAL IMPURITIES TO A LIGHTER OIL, IN AT LEAST TWO STEPS

BACKGROUND OF THE INVENTION

The invention concerns the refining of liquid heavy hydrocarbon fractions containing in particular sulfur and metal impurities, such as straight-run residues, vacuum residues, heavy crude oils, deasphalted oils, pitch and asphalts in admixture with an aromatic distillate or coal hydrogenates.

The problem arising in refining these fractions is to convert them to lighter cuts, free of hetero-atomic impurities and having an improved hydrogen to carbon (H/C) ratio, suitable for use as basis material for the production of fuels such as fuel oils, gas oil and gasoline. For this purpose, it has already been proposed to use hydrotreatment processes, the general term of hydrotreatment being used to define processes involving chemical reactions of hydrogen with the fractions to be refined, in the presence of one or more catalysts, at temperatures generally from 250° to 450° C. and under pressures generally from 0.1 to 30 MPa.

However, in the present state of the art, it is not possible to treat economically charges containing amounts even as low as 10 parts per million of parts of metal impurities such as nickel, vanadium, iron, titanium, etc. .. As a matter of fact, these impurities precipitate within the pores of the hydrotreatment catalysts and are one of the main causes of a quick and irreversible deactivation of these catalysts, which generally withstand the accumulation of at most a few grams of metals per hundred grams in their pores before losing their activity, particularly their desulfurizing activity necessary to fulfill the required product specifications. The cycle periods are then very short, thus leading to a substantial decrease in the productivity of the plant, and the catalyst consumptions are high, thus leading to prohibitive operating costs.

However, a substantial improvement has been recently obtained (French patent application No 82/10757 of June 17, 1982) by using catalysts of high demetallation activity associated with to a high resistance to poisons. These catalysts also have other useful properties, particularly a substantial desulfuration activity.

SUMMARY OF THE INVENTION AND DETAILED DISCUSSION

Figure 1:
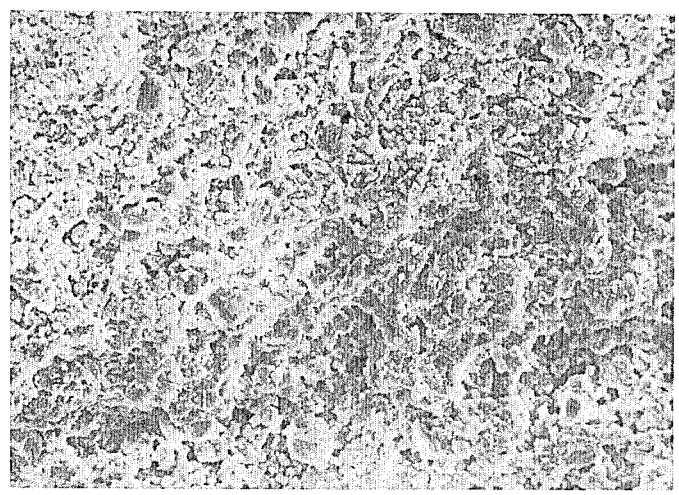
FIGS. 1–5 show photomicrographs of a catalyst suitable for use in step (a), at successively greater magnifications.
Figure 2:
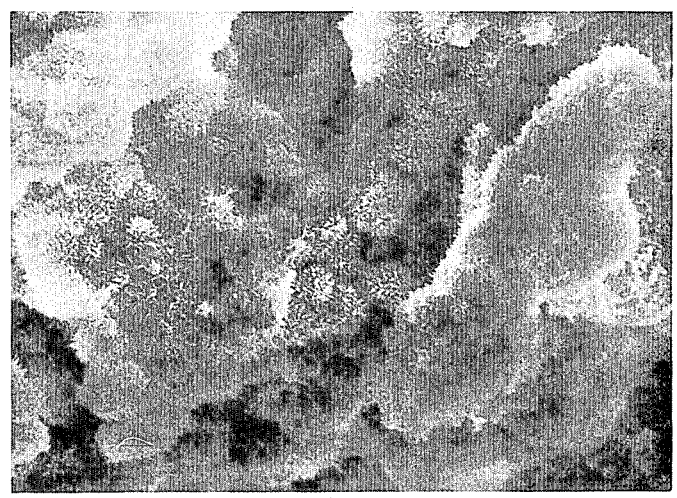
Figure 3:
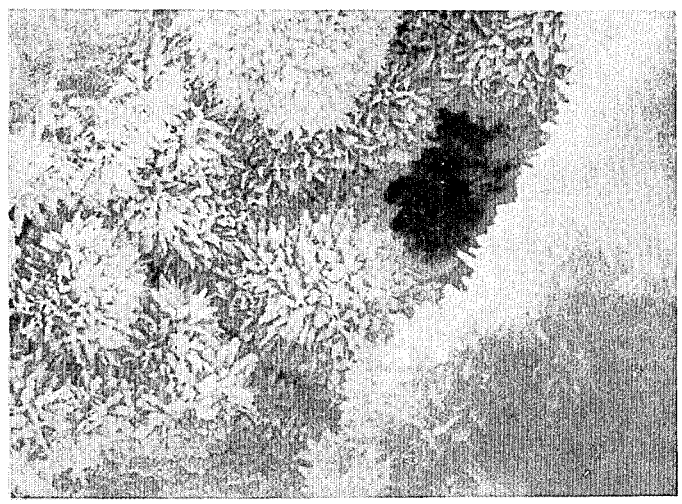

The applicant has now discovered that it could be advantageous to treat residual charges in at least two steps. The purpose of the first step is mainly to demetallize and hydrocrack the charge with moderate desulfuration thereof and the last step is used for a more extensive desulfuration. A significant advantage of the operation in at least two steps results from the fact that the captation of metal impurities, which are responsible for the irreversible deactivation of the desulfurizing activity of the hydrotreatment catalysts, is in major part effected in the first step, comprising the use of a catalyst, such as those described in the French patent application No 82/10757, whose carrier is preferably inert in the test of normal heptane cracking as defined below. This inertia property increases the resistance to deactivation resulting from carbon deposition which is another main cause of poisoning of hydrotreatment catalysts. The resultant catalysts have a very high power of captation of metal impurities without suffering from any substantial deactivation of their demetallation and hydrocracking activity: thus the product obtained at the end of the first step is extensively demetallized and contains a greater proportion of distillable fractions of normal boiling point lower than, for example, 550° C. The sulfur impurities content of this product is still too high and the refining must be continued in the subsequent steps. The last step performs an extensive desulfuration affecting even the most refractory sulfur impurities, the catalyst of this step having a high desulfuration activity and being protected against deactivation by the catalyst(s) of the preceding steps.

Another substantial advantage of a two-steps operation is to provide, in addition to a high proportion of distillable products, a residual fraction not distillable below 550° C., whose viscosity and contents of heteroatoms and insolubles in normal heptane and normal pentane are lower than those of the non-distillable residual fraction of the initial charge. This residual fraction will generally be used as fuel included in the category of the so-called no. 2 fuels or it may be partially recycled in admixture with the initial charge at the input of the first step of the process.

The applicant has thus discovered a process for treating heavy hydrocarbon fractions containing sulfur impurities and metal impurities which, suprisingly, may be operated in a very stable manner over periods of several months or even more than one year, while producing liquid hydrocarbons of very low content of heteroatoms, particularly metals and sulfur, useful for direct utilization as fuels or as charges for hydrocracking or catalytic cracking processes.

Still more surprising is the fact that this process already achieves a very substantial conversion of the heavy charge to distillates, thus reducing to a corresponding extent the recourse to the above-mentioned cracking processes: a refinery operation according to the process of the invention will thus not have to suffer from the very costly investments and operating costs involved when creating or increasing the cracking capacity of a plant.

The process of the invention comprises the following successive steps:

(a) a first step having demetallation for its essential purpose, and wherein the hydrocarbon charge, admixed with hydrogen, is passed over a catalyst of the type described in the French patent application No 82/10757, containing from 0.1 to 5% by weight, calculated as metal oxides, of at least one metal or compound of a metal from at least one of groups V, VI and VIII of the periodic classification of elements. The carrier of this catalyst is preferably inert in the test of normal heptane hydrocracking. Usually, during this first step, 60 to 95% of the demetallation is achieved, the conversion rate of the fraction normally boiling above 550° C. to a fraction normally boiling below 550° C. is preferably from 20° to 99%. Finally, the desulfuration rate is moderate, more often lower than 70%;

(b) at least one subsequent step whose essential purpose is desulfuration, wherein the product from step (a), admixed with hydrogen, is passed over a catalyst containing 7 to 30%, expressed as weight of oxides, of at least one metal or compound of a metal from at least one of groups V, VI and VIII and a carrier. At the end of step (b) the total desulfuration rate easily exceeds 85%.

The test of normal heptane cracking to which a catalyst carrier may be subjected is conducted in the presence of hydrogen under a total pressure of 1 MPa, the hydrogen to heptane ratio being 4 normal liters per liter and the hourly space velocity 1.5 grams of normal heptane per gram of carrier and per hour. An inert carrier is defined as a carrier which, in the above test, has an activity lower than 1.5 millionth of normal heptane cracked per hour and per square meter of specific surface at 500° C. and lower than 5 millionth of mole/h/$m^2$ at 470° C.

Preferably the catalyst of step (b) contains at least one tungsten and/or molybdenum compound and at least one cobalt and/or nickel compound, the ratio by weight of Co and/or Ni metals: Mo and/or W metals being from 0.2:1 to 0.5:1. Preferably the total ratio by weight of Co and/or Ni and Mo and/or W metal oxides to the specific surface is from 8 to 12 grams per 10,000 $m^2$.

With the initial charge as comparison basis, the final product may easily be demetallized to a proportion of at least 98%, desulfurized to at least 85%, and the conversion rate of the fraction normally boiling above 550° C. is at least 30%. This conversion rate (Conv. 550-) is defined as the ratio of the difference between the amounts in % by weight of said fraction in the initial charge and in the final product to the amount in % by weight of said fraction in the initial charge, with a multiplying factor of 100.

When operating in three or more reaction zones, the catalysts of the one or more intermediate steps may comply with the definition of step (a) or of the final step (b) or may have an intermediate composition.

As example of carrier, silica, silica-alumina or preferably alumina can be used. This carrier is preferably inert in the heptane test for step (a). For step (b) a larger choice is possible and a usual hydrodesulfuration catalyst can be used, although preference is be given to the same carrier in both steps.

The catalysts used in the different steps of the process have a specific surface from 50 to 350 $m^2$/g and a total pore volume from 0.4 to 2.0 $cm^3$/g. At least for step (a), the catalyst has a specific surface from 50 to 250 $m^2$/g and consists more particularly of one of the catalysts described in the French patent application No 82/10757 of June 17, 1982 corresponding to allowed U.S. application Ser. No. 505,507 filed June 17, 1983 whose disclosure is incorporated herein by way of reference and whose essential disclosure is summarized hereinafter:

These catalysts are in the form of a plurality of juxtaposed conglomerates each formed of a plurality of acicular plates, the plates of each conglomerate being generally radially oriented with respect to one another and with respect to the center of the conglomerate.

As a general rule a large proportion, mostly at least 50% of the acicular plates have a size along their longer axis from 0.05 to 5 micrometers and preferably from 0.1 to 2 micrometers, a ratio of said size to their average width from 2 to 20 and preferably from 5 to 15, a ratio of said size to their average thickness from 1 to 5000 and preferably from 10 to 200. A large proportion, generally at least 50%, of the acicular plates conglomerates form a collection of pseudo-spherical particles of an average size from 1 to 20 micrometers, preferably from 2 to 10 micrometers. Very adequate representations of such a structure are, for example, a heap of thorny chestnut-husks or a heap of sea-urchins.

These catalysts are prepared from alumina conglomerates which have themselves the above-mentioned structure and which may be obtained for example as follows:

(a) Aluminum conglomerates are treated in an aqueous medium formed of a mixture of at least one acid able to dissolve at least a portion of alumina conglomerates and at least one compound supplying an anion able to combine with the dissolved aluminum ions, this latter compound being a chemical compound different from the above-mentioned acid.

(b) The resultant conglomerates are simultaneously or subsequently subjected to a treatment at a temperature from about 80° C. to about 250° C. for a period from about a few minutes up to about 36 hours.

(c) The conglomerates are optionally dried and are subjected to a thermal activation at a temperature from about 500° C. to about 1100° C.

According to the invention, an acid able to dissolve at least a portion of the alumina of the conglomerates is any acid which, when contacted with the active alumina conglomerates as above defined, dissolved at least a portion of the aluminum ions. The acid must dissolve at least 0.5% and at most 15% by weight of the alumina of the conglomerates. Its concentration in the aqueous treatment medium must be lower than 20% by weight and preferably from 1% to 15%.

Strong acids such as nitric acid, hydrochloric acid, perchloric acid, sulfuric acid or weak acids at such a concentration that their aqueous solution has a pH lower than about 4, are preferably used.

According to the invention, a compound supplying an anion able to combine with dissolved aluminum ions is any compound able to liberate in solution an anion A(−n) able to form with cations Al(3+), products having an atomic ratio n(A/Al) lower than or equal to 3. An illustration of particular compounds is given by basic salts of general formula $Al_2(OH)$ xAy wherein $0<x<6$; $ny<6$; n representing the number of charges of anion A.

The concentration of this compound in the aqueous treatment medium must be lower than 50% by weight and preferably from 3% to 30%.

Preferred compounds are those able to liberate in solution the anions selected from the group consisting of nitrate, chloride, sulfate, perchlorate, chloroacetate, dichloroacetate, trichloroacetate, bromoacetate, dibromoacetate anions and the anions of the general formula:

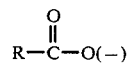

wherein R is a radical selected from the group comprising H, $CH_3$, $C_2H_5$, $CH_3CH_2CH_2$, $(CH_3)_2CH$.

The compounds able to liberate in solution the anion A(−n) may effect this liberation, either directly, for example by dissociation, or indirectly, for example by hydrolysis. The compounds may in particular be selected from the group comprising: inorganic or organic acids, anhydrides, organic or inorganic salts, esters. Among the inorganic salts there can be mentioned the alkali or alkaline-earth metal salts soluble in aqueous medium such as the sodium, potassium, magnesium, calcium, ammonium, aluminum and rare earth metal salts.

Preferred metals from groups V, VI and VIII are vanadium, molbydenum, tungsten, nickel, iron and/or cobalt, particularly associations of metals such as cobalt+molybdenum, nickel+molybdenum, nickel+tungsten, nickel+cobalt+molybdenum, iron+cobalt+molybdenum, or nickel+vanadium. These metals are introduced into the catalyst in any known form, for example as ammonium molybdate, ammonium vanadate, ammonium tungstate, nickel acetate or nitrate, cobalt acetate or nitrate.

The first one or more steps (a) is (are) conducted at a temperature generally from 350° to 430° C., preferably from 390° to 420° C. in order to obtain a maximum conversion to fractions normally distilling below 550° C. (fraction 550-) under a pressure from 5 to 20 MPa, preferably 10 to 20, for a maximum conversion to 550- fraction, with a hourly feed rate of liquid charge (VVH) from 0.2 to 2.0, preferably from 0.2 to 1 for the maximum conversion to 550-fraction. The hydrogen amount admixed with the charge is usually from 500 to 3000 $Nm^3/m^3$ of liquid charge. The operation is usefully conducted in the presence of hydrogen sulfide and the hydrogen sulfide partial pressure in step (a) is from 0.005 times to 0.20 times, preferably from 0.02 to 0.15 times the total pressure.

Step (b) is conducted within ranges of temperature, pressure, VVH and ratio of hydrogen to charge included within the above-mentioned limits for step (a) but preferably at a lower temperature and pressure and at a higher VVH. The hydrogen sulfide partial pressure is preferably lower in step (b) than in step (a). It can be fixed at a value between 10 and 90% of the value fixed for step (a), preferably between 20 and 80%. The decrease in temperature and/or partial pressure of hydrogen sulfide between the two successive steps may be effected by means of quenches with fresh hydrogen as well known in the art.

Each step may be conducted indifferently according to fixed bed, moving bed or ebullated bed techniques well known in the art. However, the process of the invention is preferably operated with a fixed bed for the first step and a moving bed for all the other steps.

The charges which may be treated according to the invention are, for example, straight-run or vacuum distillation residues, deasphalted oils, crude oils of any origin, bituminous sands or shales and their extracts, asphalts in admixture with at least 15% by weight of aromatic distillate or the above-mentioned charges in admixture with distillates, or coal hydrogenates. These charges usually contain at least 10 ppm by weight of metals (nickel and/or vanadium) and at least 0.5% by weight of sulfur.

EXAMPLE 1

5 kg of alumina balls obtained by a process disclosed in the French Pat. No 1 438 497 are treated in a reactor of a 10 liters capacity. These balls have the following characteristics:

Specific surface: 192 $m^2/g$
Total pore volume: 0.84 $cm^3/g$
Volume of the pores of an average diameter smaller than 10 nanometers: 0.06 $cm^3/g$
Volume of the pores of an average diameter from 10 to 100 nanometers: 0.40 $cm^3/g$
Volume of the pores of an average diameter from 100 to 500 nanometers: 0.10 $cm^3/g$
Volume of the pores of an average diameter from 500 to 1000 nanometers: 0.10 $cm^3/g$
Volume of the pores of an average diameter larger than 1000 nanometers: 0.18 $cm^3/g$ The treatment is effected in vapor phase at a temperature of 195° C. for 3 hours. The treatment medium consists of a mixture of nitric acid at a concentration of 7 g per 100 g of $Al_2O_3$ and acetic acid at a concentration of 10 g per 100 g of $Al_2O_3$. Nitric acid dissolves about 2.5% by weight of the alumina balls. Acetic acid supplies the acetate anion which combines with aluminum ions in solution to form compounds having an atomic ratio $CH_3COOH/Al$ lower than 3. The resultant balls are thermally activated at 900° C. for 2 hours in a furnace. Their characteristics are then as follows:

Packed filling density: 0.46 $g/cm^3$
Granulometry: 2 to 4 mm
Total pore volume: 1.10 $cm^3/g$
Specific surface: 115 $m^2/g$
Volume of the pores of an average diameter smaller than 10 nanometers: 0.03 $cm^3/g$
Volume of the pores of an average diameter from 10 to 100 nanometers: 0.72 $cm^3/g$
Volume of the pores of an average diameter from 100 to 500 nanometers: 0.15 $cm^3/g$
Volume of the pores of an average diameter from 500 to 1000 nanometers: 0.12 $cm^3/g$
Volume of the pores of an average diameter larger than 1000 nanometers: 0.08 $cm^3/g$ It thus appears that the treatment has almost entirely eliminated the pores of an average diameter smaller than 10 nanometers, has increased the amount of pores of an average diameter from 10 to 100 nanometers and decreased the amount of pores of an average diameter larger than 1000 nanometers.

The resultant alumina balls are essentially inert in the test of normal heptane cracking i.e. their activity in this test is lower than 10 millionth of mole of normal heptane cracker per hour and per square meter of specific surface at 500° C. and lower than 5 millionth of mole/h/$m^2$ at 470° C. The test is performed in the presence of hydrogen, the ratio of the hydrogen to heptane flow rates being 4 normal liters per liter and the hourly space velocity 1.5 g of liquid charge per gram of alumina and per hour. With balls prepared as above indicated, specific activities from 0.6 millionth of mole/hour/$m^2$ at 470° C. and 8.0 millionth of mole/hour/$m^2$ at 500° C. have been obtained.

376.2 grams of ammonium heptamolybdate tetrahydrate are weighed exactly, then dissolved into 1000 $cm^3$ of distilled water in a reactor stirred and maintained at 60° C. Separately 256.06 g of nickel nitrate hexahydrate are weighed exactly and dissolved at room temperature in a stirred reactor containing 1000 $cm^3$ of distilled water. Both solutions are then mixed and the temperature of this mixture forming the solution B is adjusted to 25° C. Immediately thereafter, 450 $cm^3$ of solution B are withdrawn and diluted with 150 $cm^3$ of distilled water to form solution A3. 1 liter of the remaining solution B is diluted with one liter of distilled water to give solution A2. 1 liter of solution A2 is diluted with one liter of distilled water to give solution A1. 1 liter of solution A1 is diluted with 1 liter of distilled water to give solution A. 5 batches of 460 g of alumina balls obtained in the preceding step are formed. 506 $cm^3$ of each of the solutions A, B, A1, A2, A3 are contacted with each of the batches of alumina balls by dry impregnation technique well known in the art. The batches of impregnated balls are then maintained for 12 hours in a confined atmosphere, saturated with steam and then dried in a dry air stream at 110° C. The batches of dried balls are then calcined in a revolving furnace directly heated by a combustion flame first for 2 hours at 350° C., then for 2 hours at 500° C., the latter calcination being the final operation in the preparation of the catalysts. 1 liter of each of the 5 catalysts similarly referenced A, B, A1, A2, A3 are respectively obtained from the batches impregnated with the solutions.

The chemical analysis of the prepared catalysts indicate the composition reported in Table 1 expressed in % by weight. These catalysts all had the same carrier and similar chemical compositions with contents of active metals-molybdenum and nickel-very different and increasing in the order A, A1, A2, A3, B. In all these catalysts the atomic ratio nickel/(nickel+molybdenum) is 0.30.

TABLE 1

CHEMICAL COMPOSITION OF THE CATALYST OF EXAMPLE 1

| Catalyst | A | B | A1 | A2 | A3 |
|---|---|---|---|---|---|
| % $Al_2O_3$ | 97.875 | 83.0 | 95.75 | 91.5 | 87.25 |
| % $MoO_3$ | 1.75 | 14.0 | 3.5 | 7.0 | 10.5 |
| % NiO | 0.375 | 3.0 | 0.75 | 1.5 | 2.25 |

Figure 4:
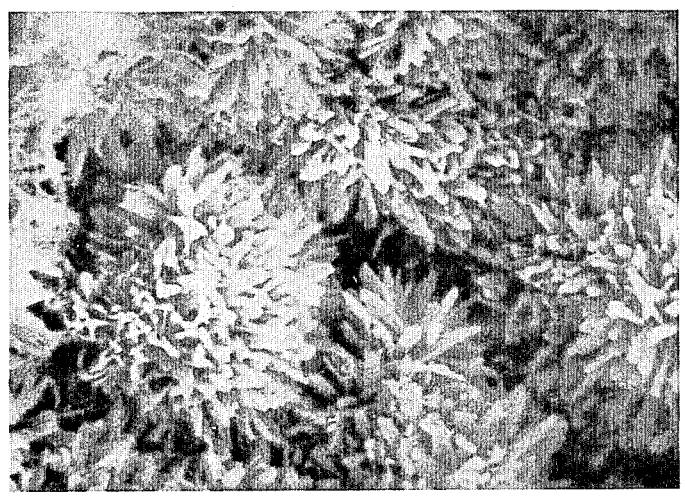
Figure 5:
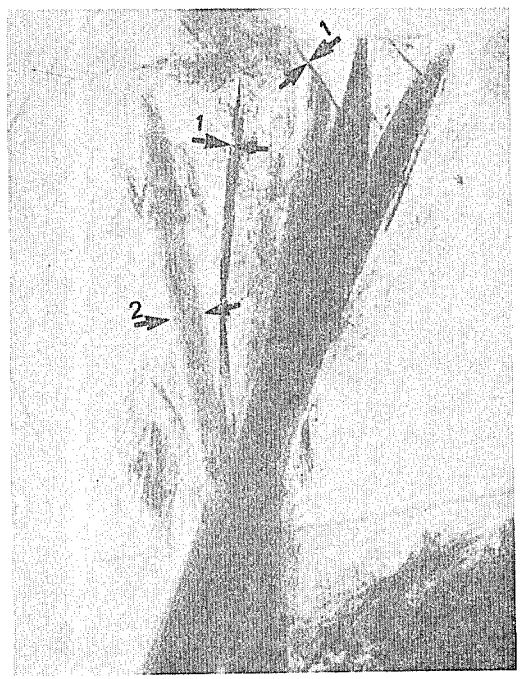

FIGS. 1 to 4 show microphotographs of catalyst A obtained by means of a scanning electron microscope of trade mark JEOL, Model JSM 35 CF at respective magnifications of 300, 3 000, 10 000 and 20 000. The scales indicated on each photograph make it possible to measure the sizes of the observable details. The dark portions correspond to the porosity while the pale portions correspond to the catalytic substance. It is apparent that catalyst A effectively has a structure of the "sea-urchins" type, i.e. corresponding to a juxtaposition of conglomerates having in majority an average size of 3.5 micrometers, each conglomerate being formed of acicular elongate plates generally assembled radially with respect to the center of the conglomerates. The size of the acicular plates can be measured in particular on FIG. 5 which is a microphotograph taken with a nominal enlargement of 200,000 with a scanning transmission electron microscope (S.T.E.M. VG HB 5). The dark zones correspond here to the catalytic substance. The scale of this microphotograph is 9 nanometers per millimiter. The intervals defined by the opposite arrows referenced 1 and 2 respectively correspond to the traces of the acicular plates arranged perpendicularly and parallely to the plane of the picture. The intervals 1 hence give an approximate measurement of the plate thickness and the interval 2 a measurement of the plate width, i.e. respectively about 2 to 4 nanometers and 60 nanometers. Along their axis of greater length the plates of FIG. 5 have a length of about 0.5 to 1 micrometer, which is in accordance with the length measurable on FIG. 4 showing these plates arranged in the conglomerates. The ratio of the average length to the average width is hence about 8 to 16 and the ratio of the average length to the average thickness is about 120 to 480. The examination of catalysts B, A1, A2, A3 by scanning microscopy has given the same result as for catalyst A under the same conditions, i.e. all of these catalysts have the same sea-urchins structure.

The resultant catalysts have been used in a hydrotreatment pilot plant equipped with 5 distinct serially arranged reactors, each reactor containing 250 cm³ of catalyst. A device for sampling liquid and gaseous products was provided at the output of each reactor, so as to measure separately the performances of each catalytic zone.

5 different tests have been performed with catalysts or catalyst combinations as indicated in Table 2. In all these tests the total hourly space velocity was maintained constant by adjusting the hourly flow rate of charge to the total amount of catalyst. In these tests the charge was a deasphalted oil (D.A.O.) of BOSCAN crude oil whose main characteristics are given in Table 3. All the catalysts were presulfided in the same conditions at the beginning of each test. The tests were conducted to compare the catalyst systems for their performances in converting fractions normally distilling below 550° C., in demetallation, desulfuration and also for their stability during these operations. The presulfuration and test conditions are summarized in table 4.

The results of the tests are given in Table 5. This table reports the performances obtained after 48 hours of operation, then 1500 hours, in demetallation (HDM), desulfuration (HDS) and conversion to a 550-fraction (Conv 550-).

The results reported in Table 5 clearly show the improvement obtained by the process of the invention: catalyst A alone effects a HDM of at least 80% and a conversion to 550-distillates of about 30%, under very stable conditions during time in spite of a high nickel and vanadium content of said DAO charge. On the contrary, the desulfuration rate is low. Catalyst B alone has good initial performances in HDM and conversion but, surprisingly, its performance is relatively poor in HDS. This catalyst is proving very unstable as shown by its very low residual activity for the three operations after 1500 hours of run. The association B+A has performances and stability lower than those of B alone. On the contrary the association A+B according to the invention results in a very stable operation of the catalytic system with performances always higher than 85% for desulfuration. The association A+A1+A2+A3+B, also possible according to the invention, has a stability comparable to that of A+B and performs a slightly more extensive refining. This example hence illustrates the high interest of the hydrotreatment, in at least two steps, of a heavy hydrocarbon fraction of high sulfur and metal impurities content. The first step is performed in a reactor containing catalyst A operating specifically, in a very stable manner, the demetallation and the conversion and the second step is effected in a reactor containing catalyst B, operating an extensive desulfuration. The stability of said desulfuration is made possible by the demetallation effected in one or more of the prior steps.

TABLE 2

Catalytic systems used in the tests (250 cc of catalyst per reactor)

| Test | Reactor 1 | Reactor 2 | Reactor 3 | Reactor 4 | Reactor 5 |
|---|---|---|---|---|---|
| 1 | A | — | — | — | — |
| 2 | B | — | — | — | — |
| 3 | A | B | — | — | — |
| 4 | B | A | — | — | — |
| 5 | A | A1 | A2 | A3 | B |
| 6 | A | HR 306 | — | — | — |
| 7 | A | HR 346 | — | — | — |
| 8 | A | B | — | — | — |

TABLE 2-continued

Catalytic systems used in the tests
(250 cc of catalyst per reactor)

| Test | Reactor 1 | Reactor 2 | Reactor 3 | Reactor 4 | Reactor 5 |
|---|---|---|---|---|---|
| 9 | A | B | — | — | — |

TABLE 3

Characteristics of the deasphalted oil charge (DAO) from a Boscan crude oil used in tests 1 to 7

| | |
|---|---|
| Density at 20° C. (g/cm³) | 0.989 |
| Viscosity at 100° C. (mm²/s) | 161 |
| Viscosity at 150° C. (mm²/s) | 25.3 |
| Conradson carbon (% weight) | 10.3 |
| Insolubles in n-heptane (% by weight) | 0.17 |
| Insolubles in n-pentane (% by weight) | 1.7 |
| Total sulfur (% by weight) | 5.16 |
| Nickel (ppm) | 47 |
| Vanadium (ppm) | 400 |
| Fraction distilling below 550° C. (% by weight) | 50 |

TABLE 4

Operating conditions and presulfuration procedure selected for tests 1 to 7

| | |
|---|---|
| Total pressure (MPa) | 10 |
| Hourly space velocity (l/l/h) | 1 |
| Hydrogen/charge ratio (Nl/l) | 1000 |
| Temperature (°C.) | 380 |

Catalyst presulfuration by means of a mixture of hydrogen gas + 3% by volume of hydrogen sufide at 350° C. and 1 bar, for 6 hours.

TABLE 5

Results of the DAO hydrotreatment comparative tests of example 1

| | Test 1 | Test 2 | Test 3 | Test 4 | Test 5 |
|---|---|---|---|---|---|
| Catalytic system | A | B | A + B | B + A | A + A1 + A2 + A3 + B |
| After 48 h | | | | | |
| HDM (%) | 85.0 | 95.0 | 99.0 | 90.0 | 99.2 |
| HDS (%) | 45.0 | 52.0 | 86.0 | 48.0 | 88.0 |
| Conv 550- (%) | 30.0 | 32.0 | 30.5 | 31.0 | 31.0 |
| After 1500 h | | | | | |
| HDM (%) | 80.0 | 15.0 | 98.5 | 12.5 | 99.0 |
| HDS (%) | 40.0 | 10.5 | 85.2 | 6.5 | 86.0 |
| Conv 550- (%) | 28.0 | 21.5 | 31.0 | 18.0 | 31.5 |

EXAMPLE 2

Catalyst A of example 1 is associated to catalyst HR 306 and to catalyst HR 346 respectively. These hydrodesulfuration catalysts are sold in the trade by Societe Francaise PROCATALYSE. The associations A+HR 306 on the one hand and A+HR 306 on the other hand are tested in the conditions and with a charge described in example 1 under respective references: test 6 and test 7. The results are summarized in Table 6. This example shows that a catalyst known in the art can also be used in the last desulfuration step, according to the invention. However the performances recorded after 1500 hours of run show that the overall stability of this catalytic association is lower than that which can be obtained with the preferred association of the A+B type wherein catalysts A and B have the same carrier and the same above-described sea-urchins structure and, in addition, are inert in the normal heptane cracking test.

EXAMPLE 3

The association of catalysts A in the first reactor and B in the second reactor of the pilot unit mentioned in example 1 is used for the hydrotreatment of a straight-run residue of SAFANYA whose characteristics are indicated in Table 7. The selected operating conditions are more severe than in the preceding tests. They are summarized in Table 8. The results are reported in Table 6 (test 8). The characteristics of the intermediate products, i.e. those obtained at the end of the first step, and the final products, are also indicated in Table 7.

This example shows that the process according to the invention makes it possible to refine very extensively a straight-run residue previously considered as substantially unaffected by such a treatment and this with a very stable performance over a long run.

EXAMPLE 4

The test of example 3 is repeated but with an asphalt charge admixed with 35% by weight of aromatic distillate obtained by catalytic cracking (LCO). The results of this test, referred to as test 9 are indicated in Table 7. The main characteristics of said diluted asphalt charge as well as those of the intermediate products (after the first step over catalyst A) and final products are summarized in Table 9. It may be observed that the process of the invention also provides for a successful treatment of this type of charges of high asphaltene content in a stable manner, which was impossible according to the prior art. The straight-run residue or fraction of boiling point higher than 350° C. of the final product of said hydrotreatment amounts to about 50% by weight and fulfils the normal specifications of a liquid fuel called fuel No 2.

TABLE 6

| | Test 6 | Test 7 | Test 3 | Test 8 | Test 9 |
|---|---|---|---|---|---|
| Catalytic system | A + HR306 | A + HR346 | A + B | A + B | A + B |
| After 48 h | | | | | |
| HDM (%) | 95.0 | 95.0 | 99.0 | 99.4 | 99.1 |
| HDS (%) | 86.5 | 88.0 | 86.0 | 95.7 | 95.6 |
| Conv 550- (%) | 30.0 | 31.5 | 30.5 | 45.0 | 70.0 |
| After 1500 h | | | | | |
| HDM (%) | 93.0 | 15.0 | 98.5 | 98.0 | 98.3 |
| HDS (%) | 82.5 | 82.0 | 85.2 | 92.5 | 89.0 |
| Conv 550- (%) | 28.0 | 28.5 | 31.0 | 43.0 | 65.7 |

TABLE 7

Characteristics of the charge of straight-run residue from SAFANYA crude oil used in test 8 and of the intermediate (A) and final (A + B) products

| | Charge | A | A + B |
|---|---|---|---|
| Density at 20° C. (g/cm³) | 0.996 | 0.900 | 0.75 |
| Viscosity at 100° C. (mm²/s) | 208 | 3.25 | |
| Viscosity at 150° C. (mm²/s) | 32 | 1.59 | |
| Conradson carbon (% by weight) | 15.2 | 5.9 | 3.0 |
| Insolubles in n-heptane (% by weight) | 7.8 | 1.7 | 0.2 |
| Insolubles in n-pentane (% by weight) | 17.0 | 6.5 | 2.5 |
| Total sulfur (% by weight) | 4.92 | 1.1 | 0.17 |
| Nickel (ppm) | 37 | 1 | 0.5 |
| Vanadium (ppm) | 101 | 2 | 0.5 |
| Fraction distilling below 550° C. (% by weight) | 42.5 | 82 | 85 |

TABLE 8

Selected operating conditions and presulfuration procedure for the tests effected on residues and asphalts

| | |
|---|---|
| Total pressure (MPa) | 14 |
| First step (catalyst A) | |
| Hourly space velocity (l/l/h) | 0.3 |
| Temperature (°C.) | 410 |
| Second step (catalyst B) | |
| Hourly space velocity (l/l/h) | 1.5 |
| Hydrogen/charge ratio (Nl/l) | 1000 |
| Total hourly space velocity for the association A + B (l/l/h) | 0.25 |

Catalyst presulfuration by means of a mixture of hydrogen gas + 3% by volume of hydrogen sulfide at 350° C. and 1 bar, for 6 hours.

TABLE 9

Characteristics of the asphalt charge diluted with 35% by weight of LCO used for test 9 and resultant intermediate and final products

| | Charge | A | A + B |
|---|---|---|---|
| Density at 20° C. (g/cm$^3$) | 1.065 | 0.960 | 0.916 |
| Viscosity at 100° C. (mm$^2$/s) | 1000 | 3.40 | |
| Viscosity at 150° C. (mm$^2$/s) | 110 | 1.62 | |
| Conradson carbon (% by weight) | 27.5 | 12.0 | 6.0 |
| Insolubles in n-heptane (% by weight) | 22.5 | 7.0 | 1.10 |
| Insolubles in n-pentane (% by weight) | 54.0 | 6.5 | 3.0 |
| Total sulfur (% by weight) | 5.55 | 1.6 | 0.24 |
| Nickel (ppm) | 70 | 12.4 | 0.6 |
| Vanadium (ppm) | 240 | 43.2 | 2.0 |
| Fraction distilling below 550° C. (% by weight) | 35 | 73 | 75 |

What is claimed is:

1. A process for the hydrotreatment of a heavy hydrocarbon fraction containing sulfur impurities and metal impurities, comprising the steps of:
   (a) passing said hydrocarbon fraction in admixture with hydrogen, under hydrodemetallation conditions, over a catalyst comprising a carrier and from 0.1 to 5% by weight, calculated as metal oxides, of at least one metal or compound of a metal from at least one of groups V, VI and VIII, said catalyst being in the form of a plurality of juxtaposed conglomerates each formed of a plurality of acicular plates, the plates of each conglomerate being generally oriented radially with respect to one another and with respect to the center of the conglomerate, wherein said catalyst contains a major proportion of wedge-shaped mesopores, and has an improved resistance to pore mouth plugging compared with bimodal or monomodal porous catalysts; and
   (b) treating the effluent from step (a) with hydrogen, under hydrodesulfuration conditions, in contact with a catalyst containing a carrier and from 7 to 30% by weight, calculated as metal oxides, of at least one metal or compound of a metal from at least one of groups V, VI and VIII.

2. A process according to claim 1, wherein the conditions of step (a) are so selected as to effect a 60-95% demetallation of the charge, a 20-99% conversion of the charge fraction normally boiling above 550° C. to distillates of lower boiling point, less than a 70% desulfuration of the charge; and the conditions of step (b) are so selected as to increase the total desulfuration of the charge to at least 85%.

3. A process according to claim 1, wherein steps (a) and (b) are each independently effected at a temperature of 350°-430° C., a total pressure of 5-20 MPa, and a total hourly space velocity of the liquid charge of 0.2-2.

4. A process according to claim 3, wherein in each of steps (a) and (b), independently, said temperature is 390°-420° C., said total pressure is 10-20 MPa, and said total hourly liquid space velocity is 0.2-1.

5. A process according to claim 1, wherein at least 50% of the acicular plates of the catalyst of step (a) have a size along their longer axis of 0.05-5 micrometers, a ratio of said size to their average width of 2-20, and a ratio of said size to their average thickness of 1-5,000.

6. A process according to claim 5, wherein the catalyst is in the form of a collection of approximately spherical particles of an average size of 1-20 micrometers.

7. A process according to claim 1, wherein the carrier is alumina.

8. A process according to claim 1, wherein the catalyst carrier of step (a) is inert in the normal heptane cracking test.

9. A process according to claim 1, wherein steps (a) and (b) are each effected in the presence of hydrogen sulfide.

10. A process according to claim 9, wherein the average partial pressure of hydrogen sulfide in step (b) is from 10 to 90% of its corresponding value in step (a), where it is 0.005-0.2 times the total pressure.

11. A process according to claim 10, wherein the average partial pressure of hydrogen sulfide in step (a) is 0.02-0.15.

12. A process according to claim 1, wherein the catalyst of the final hydrodesulfuration reaction zone comprises at least one molybdenum and/or tungsten compound and at least one nickel and/or cobalt compound, the ratio by weight of the nickel and/or cobalt metals to the molybdenum and/or tungsten metals being from 0.2:1 to 0.5:1.

13. A process according to claim 1, wherein the heavy hydrocarbon fraction is a distillation residue, a crude oil, a deasphalted oil, an asphalt dissolved in at least 15% by weight of aromatic distillate, or a coal hydrogenate.

14. A process according to claim 1, wherein the heavy hydrocarbon fraction contains at least 10 parts per million by weight of metal impurities and at least 0.5% by weight of sulfur.

15. A process according to claim 1, wherein the amount of hydrogen admixed with the charge in step (a) is 500-3,000 Nm$^3$/m$^3$ of liquid charge.

* * * * *